(12) United States Patent
Kristofik et al.

(10) Patent No.: US 9,619,589 B2
(45) Date of Patent: Apr. 11, 2017

(54) METHOD OF DETERMINING OPTICAL SENSOR COVERAGE

(75) Inventors: Michelle Lynn Kristofik, Saint Peters, MO (US); Dennis Mack Williams, Saint Charles, MO (US)

(73) Assignee: The Boeing Company, Chicago, IL (US)

( * ) Notice: Subject to any disclaimer, the term of this patent is extended or adjusted under 35 U.S.C. 154(b) by 1113 days.

(21) Appl. No.: 12/466,624

(22) Filed: May 15, 2009

(65) Prior Publication Data

US 2011/0035199 A1    Feb. 10, 2011

Related U.S. Application Data

(60) Provisional application No. 61/164,403, filed on Mar. 28, 2009.

(51) Int. Cl.
*G06G 7/48* (2006.01)
*G06F 17/50* (2006.01)

(52) U.S. Cl.
CPC ...... *G06F 17/5009* (2013.01); *G06F 17/5095* (2013.01); *G06F 2217/16* (2013.01)

(58) Field of Classification Search
CPC ............. G06F 17/5009; G06F 17/5095; G06F 2217/16
USPC ........ 703/5, 1; 396/120; 348/48, 143, 220.1; 356/138
See application file for complete search history.

(56) References Cited

U.S. PATENT DOCUMENTS

| | | | |
|---|---|---|---|
| 4,489,366 A | 12/1984 | Rozniecki | |
| 5,015,844 A * | 5/1991 | Cole | 250/227.24 |
| 6,297,763 B1 | 10/2001 | Thomson | |
| 2004/0225480 A1* | 11/2004 | Dunham | 703/1 |
| 2005/0002662 A1* | 1/2005 | Arpa et al. | 396/120 |
| 2005/0134499 A1 | 6/2005 | Liu | |
| 2007/0008408 A1* | 1/2007 | Zehavi | 348/143 |
| 2007/0115358 A1* | 5/2007 | McCormack | 348/159 |
| 2007/0115368 A1* | 5/2007 | Kamiya | 348/220.1 |
| 2008/0007720 A1* | 1/2008 | Mittal | 356/138 |
| 2008/0068151 A1 | 3/2008 | Ouzana | |
| 2010/0201787 A1* | 8/2010 | Zehavi | 348/48 |

OTHER PUBLICATIONS

Z. Zhang et al., "3D tetrahedron ray tracing algorithm," 2001, Electronic Letters, vol. 37, No. 6, pp. 334-335.*
Zhengqing Yun et al., "Fast ray tracing procedure using space division with uniform rectangular grid," 2000, Electronics Letters, vol. 36, No. 10, pp. 895-897.*

(Continued)

*Primary Examiner* — Kamini S Shah
*Assistant Examiner* — Russ Guill
(74) *Attorney, Agent, or Firm* — Hanley, Flight & Zimmerman, LLC (57) ABSTRACT

A method is provided of determining the coverage of at least one optical sensor in a three dimensional (3-D) area. The 3-D area is divided into cells. The field of view of the sensor in the 3-D area is determined and rays are projected from the sensor into the 3-D area within sensor's field of view. The intersections between the rays and the cells are determined and a visual display of the 3-D area is generated showing the coverage of the sensor, based on the intersections.

20 Claims, 7 Drawing Sheets (56) References Cited

OTHER PUBLICATIONS

Magdy F. Iskander et al., "Outdoor/indoor propagation modeling for wireless communications systems," 2001, IEEE Antennas and Propagation Society International Symposium, pp. 150-153.*
Anurag Mittal et al., "Visibility analysis and sensor planning in dynamic environments," 2004, Lecture Notes in Computer Science, vol. 3021, pp. 175-189.*
Josef Scheuer et al., "Supporting surveillance through arrangement of video streams in a 3D environment," 2007, Delft University of Technology, Technical Report VIS2007-01, pp. 1-11.*
Biagio Cosenza, "A survey on exploiting grids for ray tracing," Jul. 2, 2008, Eurographics Italian Chapter Conference, pp. 89-96.*
Jonathan Fournier et al., "Mapping and exploration of complex environments using persistent 3D model," 2007, Fourth Canadian Conference on Computer and Robot Vision, eight pages.*
Steven Parker et al., "Interactive Ray Tracing for Volume Visualization," 1999, IEEE Transactions on Visualization and Computer Graphics, vol. 5, No. 3, pp. 1-13.*
Arie Kaufman et al., "Volume Graphics," Jul. 1993, Computer, pp. 51-64.*
Alan T. Murray et al., "Coverage optimization to support security monitoring," 2007, Computers, Environment and Urban Systems, vol. 31, pp. 133-147.*
F. Angella et al., "Optimal deployment of cameras for video surveillance systems," 2007, IEEE Conference on Advanced Video and Signal Based Surveillance, pp. 388-392.*
Survivability/Vulnerability Information Analysis Center, "COVART—Computation of Vulnerable Area Tool," Feb. 17, 2009, downloaded from the Wayback Machine for web page bandayton.com/surviac/covert.htm, two pages.*
Survivability/Vulnerability Information Analysis Center, "FASTGEN—Fast Shotline Generator," Feb. 17, 2009, downloaded from the Wayback Machine for web page bandayton.com/surviac/fastgen.htm, two pages.*
Edward D. Aitken et al., "A Guide to FASTGEN Target Geometric Modeling," 1993, Army Research Laboratory, pp. 1-112.*
Mark A. Livingston et al., "Interactive operations for visualization of ad-hoc sensor system domains," 2005, IEEE International Conference on Mobile Adhoc and Sensor Systems Conference, five pages.*
Ugur Murat Erdem et al., "Automated camera layout to satisfy task-specific and floorplan-specific coverage requirements," 2006, Computer Vision and Image Understanding, vol. 103, pp. 159-169.*
Ron Dexter, "Fire modeling with the fire prediction model (FPM): application with survivability discipline," 2008, in "Aircraft Survivability," Spring 2008, 33 pages.*
Steve Richardson et al., "SAVE—An automated vulnerability assessment tool," 1996, American Institute of Aeronautics and Astronautics, nine pages.*
Santosh Kumar et al., "On k-coverage in a mostly sleeping sensor network," 2008, Wireless Networks, vol. 14, issue 3, pp. 277-294.*

* cited by examiner

METHOD OF DETERMINING OPTICAL SENSOR COVERAGE

CROSS REFERENCE TO RELATED APPLICATIONS

This application claims the benefit of Provisional U.S. Patent Application No. 61/164,403, filed Mar. 28, 2009.

STATEMENT REGARDING FEDERALLY SPONSORED RESEARCH OR DEVELOPMENT

This invention was made with Government support under Contract Number N00019-04-C-3146 awarded by the U.S. Navy. The government has certain rights in this invention.

TECHNICAL FIELD

This disclosure generally relates to optical sensors, and deals more particularly with a method of determining the coverage provided by one or more optical sensors in an area containing obstructions.

BACKGROUND

Optical sensors may be used to monitor a wide range of activities. For example, optical sensors may be used in fire suppression systems to sense the presence of a flame or spark within a monitored area in order to trigger activation of a fire suppression system. In the aircraft industry, fire suppression systems may be used within enclosed areas of an aircraft, sometimes referred to as "dry bays" that may contain components such as, without limitation, hydraulic control lines, electrical equipment, etc. The fire suppression system may be controlled by optical sensors which monitor conditions within the dry bay. The components in the dry bay may form obstructions that may optically clutter the area being monitored by the sensors. Thus, in designing an optical sensor system for a dry bay, it may be important to place and orient the sensors so that they cover or "see" as much of the space within dry bay as possible, thereby optimizing sensor coverage.

Existing solutions for optimizing optical sensor coverage have been limited to techniques that may have limited effectiveness or which are time consuming and/or expensive. For example, hand drawings may be created which attempt to show optical sensor coverage. Also, CAD (computer aided design) models have been generated to aid a designer in visualizing sensor coverage within a dry bay. The results provided by both of these solutions maybe less than desirable when used in areas of dry bays containing clutter. Still another technique of determining sensor placement involves live fire testing which requires the construction of a test article simulator for the dry bay. Live fire testing may be time consuming and expensive. Moreover, the simulator may need repair after each test, and may allow only a limited area of the dry bay to be assessed.

Accordingly, there is a need for a method of determining optical sensor coverage which provides a more accurate visual display of the coverage of multiple sensors in a cluttered environment, such as a dry bay of an aircraft.

SUMMARY

The disclosed embodiments provide a method of determining the coverage provided by one or more optical sensors which is rapid and may provide more accurate results. The method may assist in optimizing the design of dry bay fire suppression systems in order to reduce cost, weight and the number of components that are required, without substantially reducing performance. The method allows a user to visually see areas of a monitored area that are covered by sensors, as well as those areas that are not covered by the sensors. The disclosed embodiments allow the user to analyze several options before selecting a final design. The method permits the user to reposition sensors and then re-run a sensor coverage analysis in order to optimize coverage of the sensor system. The method may more accurately estimate the overlap of coverage between two sensors by visually displaying the effects of blockage of sensor coverage caused by obstructions within the monitored area. The visual display of sensor coverage is easy to understand, may require little or no post processing and may be compatible with standard vulnerability result visualizers.

According to one disclosed embodiment, a method is provided of determining the coverage of at least one optical sensor in a three dimensional (3-D) area. The field of view of the sensor in the 3-D area is determined and rays are projected from the sensor into the 3-D area within the field of view of the sensor. The intersections between the rays and the cells/obstructions are determined, and using these intersections, a visual display of the 3-D area is generated which shows the coverage of the sensor. Projecting the rays may include projecting divergent rays from the sensor into the 3-D area within the field of view of the sensor. The method may further include generating a model of the 3-D area that includes obstructions and visually displaying the 3-D area model.

According to another embodiment, a method is provided of determining the coverage of at least one optical sensor monitoring a 3-D area. The position of the optical sensor within the 3-D area is determined, and a 3-D model of the area is generated based on the position of the sensor. At least one obstruction is introduced into the 3-D model and the 3-D model is divided into cells. Rays are projected from the optical sensor into the 3-D area within the model, and the cells intersected by the projected rays are identified. A visual display of the 3-D model showing the areas covered by the sensor is generated, based on the identified intersections between the rays and the cells.

According to a further embodiment, a method is provided of optimizing the coverage of optical sensors monitoring a 3-D area containing obstructions. The location and orientation for each of the sensors is selected within the 3-D area, and a 3-D model of the area is generated which includes the optical sensors. Obstructions are introduced into the 3-D model and the model is divided into cells. Rays are projected from each of the sensors into the 3-D area of the model and the cells intersected by the rays are identified. A visual display of the 3-D model is generated showing the locations of optical sensors and zones of the 3-D area not covered by the optical sensors. The number, location and/or orientation of the sensors may be changed based on the visual display in order to optimize sensor coverage.

The disclosed embodiments provide a method of determining optical sensor coverage which may be relatively rapid, less subject to human error and allows optimization of sensor coverage using software tools.

BRIEF DESCRIPTION OF THE ILLUSTRATIONS

DETAILED DESCRIPTION

Figure 1:
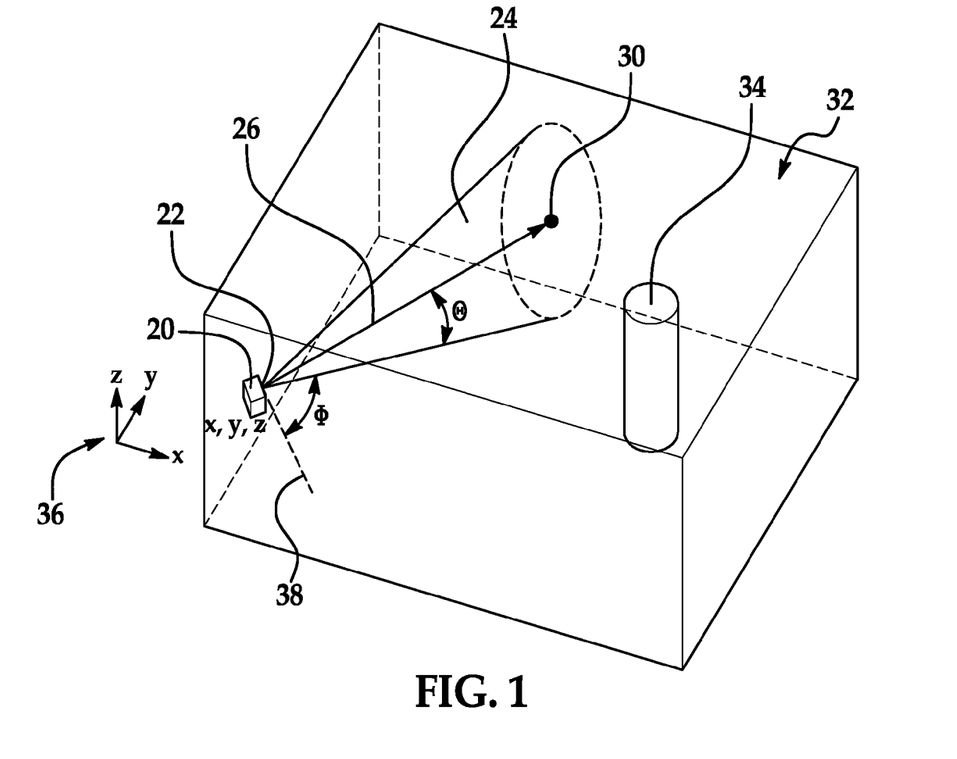
FIG. 1 is an illustration of an isometric view of a 3-D area monitored by an optical sensor, and including an obstruction.

Referring first to FIG. 1, the disclosed embodiments relate to a method of determining the coverage provided by one or more sensors 20 located within a three dimensional area 32 which, for ease of description, will be hereinafter referred to as a dry bay 32 that may be employed in aircraft (not shown). The position of the sensor 20 may be defined within a 3-D Cartesian coordinate system 36 wherein the location of the sensor 20 is defined by the spatial coordinates x, y, z. The sensor 20 may be used to sense a condition within the dry bay 32, such as a spark or flame (not shown) and activate a fire suppression system (not shown) to suppress combustion inside the dry bay 32.

The sensor 20 has a field of view (FOV) 24 which is generally cone-shaped and emanates from an eye 22 located at the center of the sensor 20. The center of the FOV 24 may be defined by a ray 26 which will be referred to hereinafter as a shot-line 26. The shot-line 26 projects from the eye 22 to a point 30 about which the FOV 24 may be substantially symmetric. The orientation of the sensor 20 may be defined in terms of the azimuth and inclination of the sensor 20. In the illustrated example, the azimuth may be represented by the angle $\phi$ of the shot-line 26 measured from a reference axis 38, and the inclination of the sensor 20 may be represented by the angle $\theta$ of the shot-line 26 measured from the x-y plane in the coordinate system 36. The dry bay 32 may include one or more obstructions 34 which may or may not, lie within the FOV 24 of the sensor 20. In FIG. 1, the obstruction 34 is located outside of the FOV 24 of the sensor 20.

Figure 2:
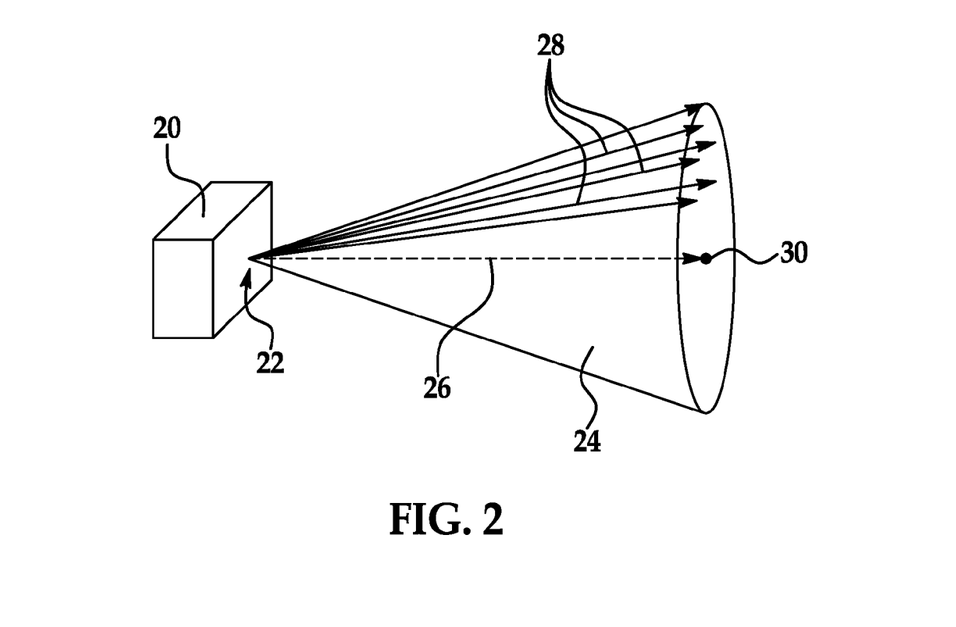
FIG. 2 is an illustration of a perspective view of the optical sensor shown in FIG. 1, better illustrating rays projected within the sensor's field of view.
Figure 3:
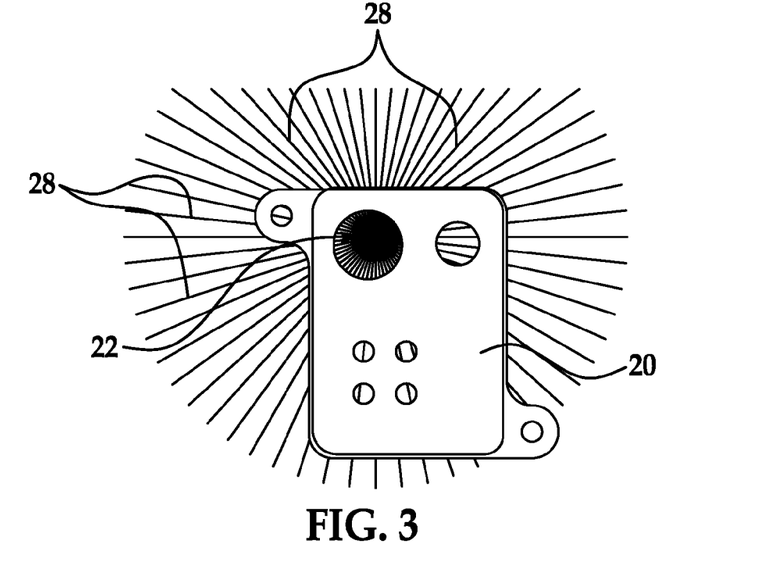
FIG. 3 is an illustration of a front view of the sensor shown in FIGS. 1 and 2, also showing the projected rays.

Referring to FIGS. 2 and 3, a method of determining coverage provided by the sensor 20, which will be discussed below, involves projecting the shot-line 26 from the eye 22 of the sensor 20 to the point 30. The method includes projecting rays 28 which diverge from the eye 22 outwardly within the FOV 24 of the sensor 20. The sensor 20 may comprise a commercially available optical sensor for detecting any of a variety of activities or conditions within the dry bay 32 that may require activation of a control system, such as without limitation, a fire suppression system. The sensor 20 may sense radiation that is within the visible range, or which is outside the visible range, including but not limited to wavelengths within the infrared or ultraviolet ranges.

Figure 4:
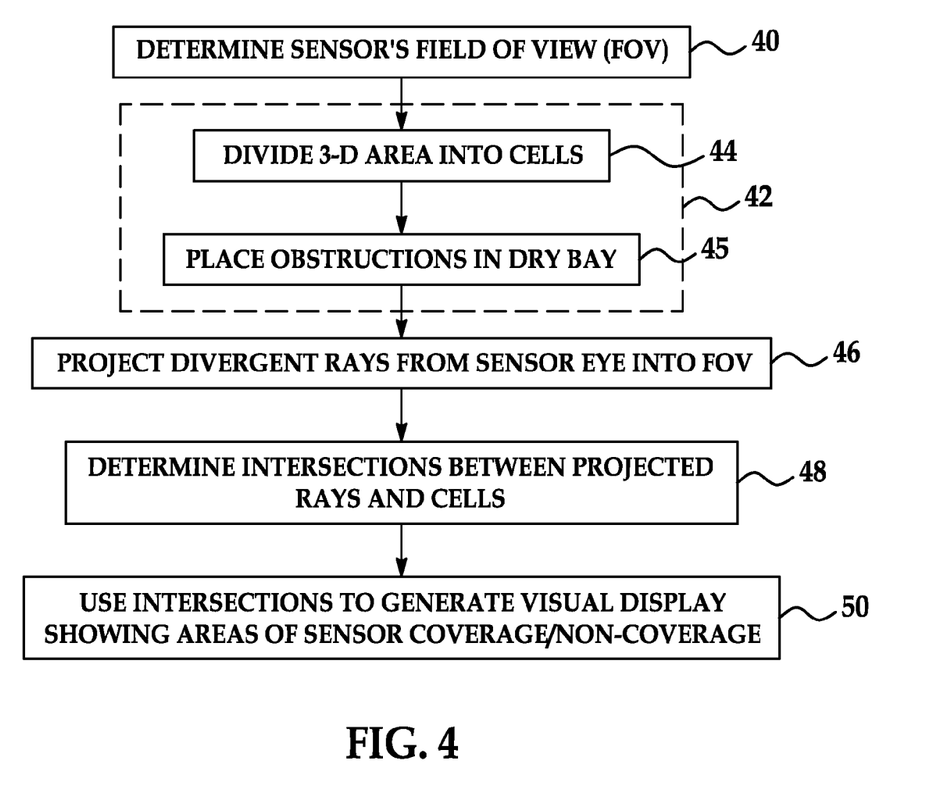
FIG. 4 is an illustration of a flow diagram of a method of determining optical sensor coverage according to the disclosed embodiments.
Figure 5:
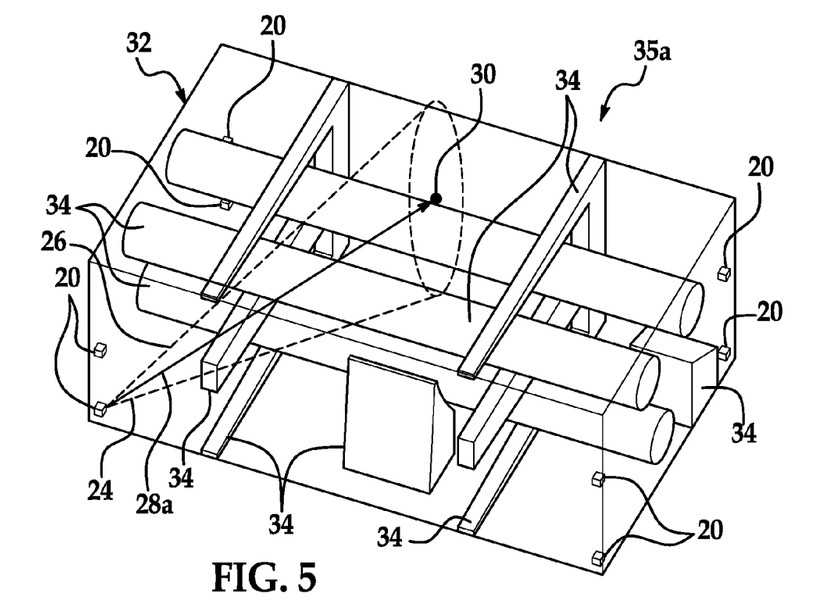
FIG. 5 is an illustration of an electronic display of a simulated dry bay of an aircraft, showing sensor locations and obstructions.

Attention is now directed to FIG. 4 which broadly illustrates the basic steps of a method of determining the coverage of one or more optical sensors. Beginning at 40, the FOV 24, shown in the electronic display 35a of FIG. 5, of a sensor 20 is determined. As previously discussed in connection with FIG. 1, the sensor's FOV 24 may be determined by determining the 3-D location and orientation of the sensor 20 based on the sensor's 20 spatial coordinates as well as its azimuth $\phi$ and inclination $\theta$.

Figure 6:
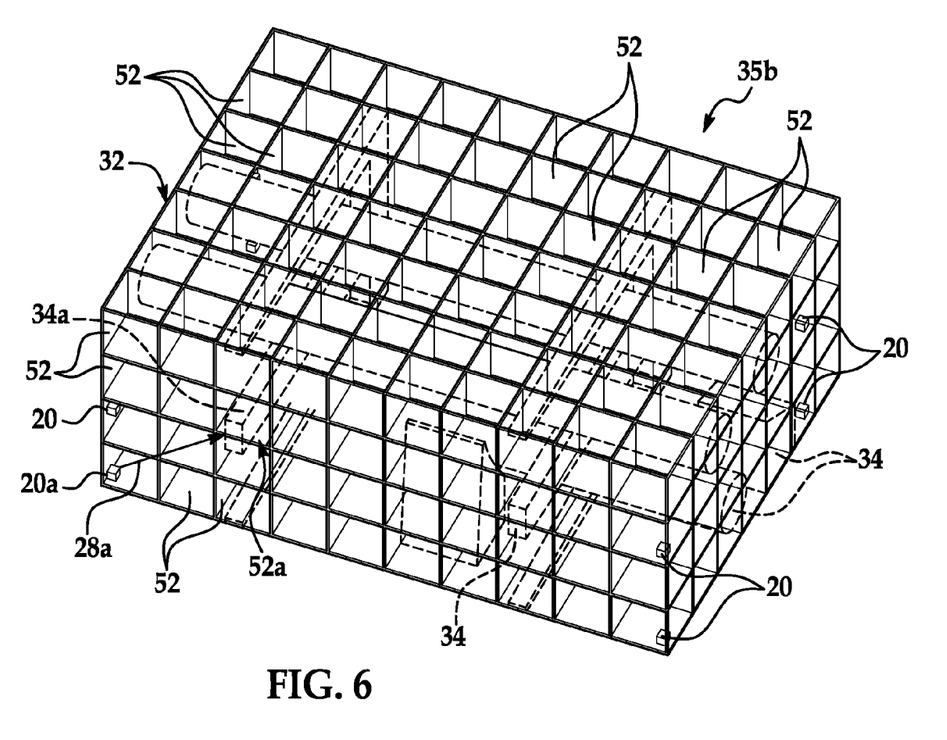
FIG. 6 is an illustration of an electronic display similar to FIG. 5 but showing a target model of the dry bay divided into 3-D cells.

Next at 42, a 3-D target model (see FIG. 6) of the dry bay 32 is generated. The 3-D target model may be generated by dividing a 3-D representation of the dry bay 32 into a plurality of cells 52 at step 44 and placing the obstructions 34 in the dry bay 32 at step 45. At this point, the 3-D display of the target model shown FIG. 6 allows the user to see which of the cells 52 contain at least part of an obstruction 34. In the illustrated example, the cells 52 are substantially rectangular cubes or blocks, however other cell geometries are possible. In the embodiment illustrated in FIGS. 5-8, the obstructions 34 may comprise, without limitation, hydraulic control lines, electrical components or other items that may need to be protected against fire or other conditions that may be sensed by the optical sensors 20. Next, at 46, divergent rays 28 (see FIGS. 2 and 3) are projected from the sensor 20 into the dry bay 32. These projected rays 28 are generated electronically using the 3-D model which will be discussed later in more detail.

Figure 7:
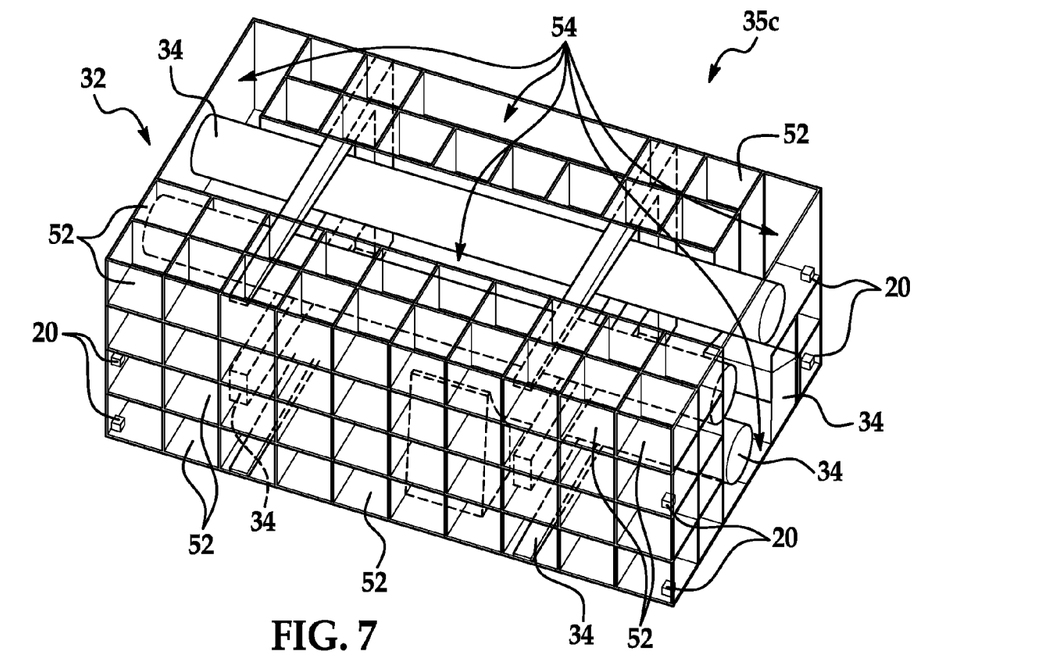
FIG. 7 is an illustration of an electronic display similar to FIG. 6, but showing areas of sensor coverage and non-coverage.

At step 48, the intersections are determined between the projected rays 28 and each of the cells 52. For example, as shown in the electronic display 35b of FIG. 6, a ray 28a projected from sensor 20a is shown as intersecting a cell 52a containing part of an obstruction 34a. Step 48 may also include determining the sequential order in which the projected rays 28 intersect the cells 52. At 50, the intersections determined in step 48 are used to generate a visual display, such as that illustrated by the electronic display 35c shown in FIG. 7, which allows a user to visually distinguish between areas of sensor coverage 52 and non-coverage 54. The areas of non-coverage 54 may also be referred to herein as gaps. The areas of sensor coverage in FIG. 7 are shown by the display of the cells 52 in certain areas of the dry bay 32, while the areas of non-coverage 54 or gaps in coverage are displayed without the cells 52. FIG. 7 shows the total coverage 52 and non-coverage 54 provided by eight of the sensors 20. Based on the coverage shown in the visual display 35c, the user may then change the number, location and/or orientation of the sensors 20 and repeat the steps of the method in order to adjust the sensor coverage.

It should be noted here that while the 3-D area shown in the accompanying drawings illustrates the presence of obstructions 34 within the dry bay 32 that may affect sensor coverage, the disclosed method may be advantageously employed to determine sensor coverage where no obstructions are present in the 3-D area (dry bay 32).

Figure 8:
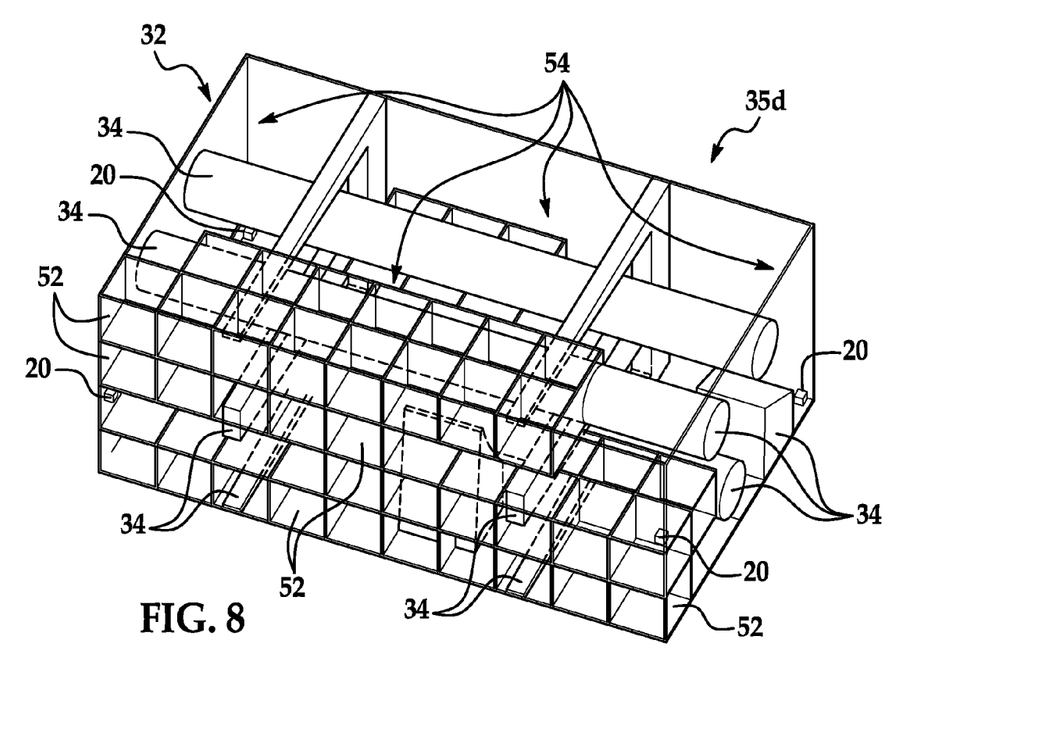
FIG. 8 is an illustration of an electronic display similar to FIG. 7, but showing the coverage provided by a fewer number of sensors, as well as the areas of non-coverage.

FIG. 8 is an electronic 3-D visual display 35d of the dry bay 32 representing the results of step 50 in FIG. 4, but wherein the number of sensors 20 is reduced from 8 to 4. By comparing FIGS. 7 and 8, it may be readily seen that certain ones of the cells 52 shown in FIG. 7 are not present in FIG. 8, thus representing a reduction in the collective coverage provided by the sensors 20.

Figure 9:
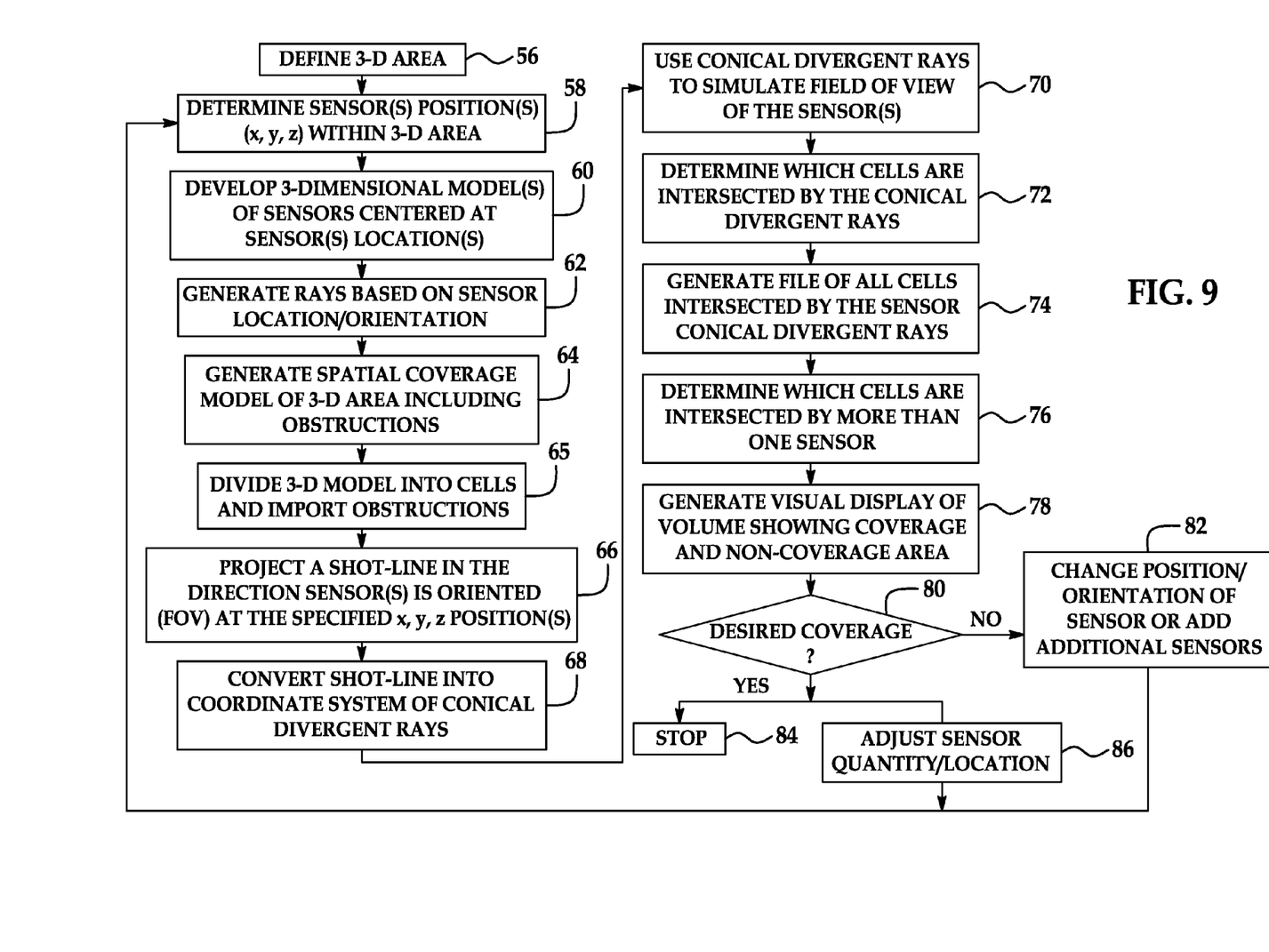
FIG. 9 is an illustration of a flow diagram showing additional details of a method of determining optical sensor coverage.

Attention is now directed to FIG. 9 which illustrates the steps of a method of optimizing the coverage provided by optical sensors 20 monitoring an area such as the previously discussed dry bay 32. Beginning at 56, a 3-D area, such as dry bay 32 is defined either in terms of its dimensions or spatial coordinates. At 58, the position of each of the sensors 20 is determined within the 3-D area defined at step 56. As previously discussed, the position of each of the sensors 20 may be defined in terms of its spatial coordinates and its orientation (azimuth $\phi$, and inclination $\theta$).

Next, at step 60, a 3-D electronic model of each of the sensors 20 is generated wherein the sensor 20 is centered at the position determined in step 58. At 62, diverging rays 28 are generated within each of the sensor's FOV 24, based on the location and orientation of the sensor 20. At step 64, a spatial coverage model of the 3-D area 32 is generated using electronic modeling, similar to the 3-D model generated by steps 44 and 45 in FIG. 4. The spatial coverage model is divided into cells 52 at step 65, and one or more of the obstructions 34 may be imported into the spatial coverage model for example and without limitation, from a CAD file. At 66, a shot-line 26 is electronically projected from the sensor 20, substantially through the center of the FOV 24 of the sensor 20. At step 68, the shot-line 26 is converted into the coordinate system of the divergent rays 28. At 70 the divergent rays 28 are used to simulate the FOV 24 of the sensors 20.

At step 72, a determination is made of which of the cells 52 are intersected by the diverging rays 28. At 74, a file is generated of all cells 52 that have been intersected by the rays 28. Next, at 76, a determination is made as to which of the cells 52 have been intersected by the rays 28 from more than one of the sensors 20. At 78, a visual display, similar to the electronic display 35c in FIG. 7, is generated of the defined 3-D area (dry bay 32) showing the areas of sensor coverage (cells 52) and non-coverage 54.

At step 80, a determination is made as to whether the sensor coverage is adequate. If the sensor coverage is adequate, the process stops at 84. In some cases, even though the sensor coverage may be determined to be adequate at 80, a further step at 86 may be carried out to optimize the sensor quantity and/or location. Adjustment may be carried out by repeating steps 58-78 until the desired result is achieved. In the event that the sensor coverage determined at 80 is not as desired, then, as shown at step 82, either the number of the sensors 20 may be changed, and/or the position and/or orientation of one or more sensors may be modified, and steps 58-78 are repeated until the coverage determined at 80 reaches the desired level.

The disclosed method, including the electronic modeling previously described in connection with FIGS. 4-9 may be carried out using one or more software programs that may be generated for a particular application. The method and electronic modeling may also be performed using known software programs, or components thereof which may be adapted for use in carrying out the steps of the method previously described in connection with FIGS. 4 and 9. For example, the disclosed method may be carried out using standard vulnerability analysis tools to visually depict optical file detector coverage of the dry bay 32. The output of the analysis allows a user to visually see in 3-D, areas 52 (FIG. 7) of the dry bay 32 that are seen by the sensors 20, and areas 54 that are not seen by the sensors 20 in 3-D.

Two known vulnerability analysis program tools that may be adapted for use in carrying out the disclosed method are software tools known as COVART (computation of vulnerable area tool) and FASTGEN (fast shot-line generator). COVART and FASTGEN were developed by the United States Department of Defense and are available from the Survivability/Vulnerability Information Analysis Center at Wright-Patterson Air Force Base Ohio. The COVART program, which is written in FORTRAN 77, carries out a method of determining the vulnerable areas and expected repair times of targets damaged by impacting single kinetic energy penetrators or high explosive rounds. COVART is commonly used to study target survivability and weapons effectiveness. COVART may model several penetrators using any of several methods, and employs input data generated by tracing shot-lines through a geometric description of the target, which in the present example, comprises the dry bay 32. COVART accepts shot-line information that may be generated by FASTGEN.

FASTGEN is a software program that may be used to predict damage to a target caused by ballistic impact of projectiles, and includes the ability to model diverging rays from bursting threats in different ways. FASTGEN traces the path of the projectile's shot-line through a target. The target may be composed of objects referred to as components, and the components are modeled by generating a 3-D target database. The set of components encountered along a shot-line is arranged in the order or sequence of the encounter. This sequenced set of components along the shot-line is referred to as a line-of-sight (LOS). FASTGEN includes an interactive user interface comprising an onscreen display that allows the user to manipulate a target by toggling screen buttons and dials. The user may view the color image of a target model in either wire frame mode or in a shade mode.

Figure 10:
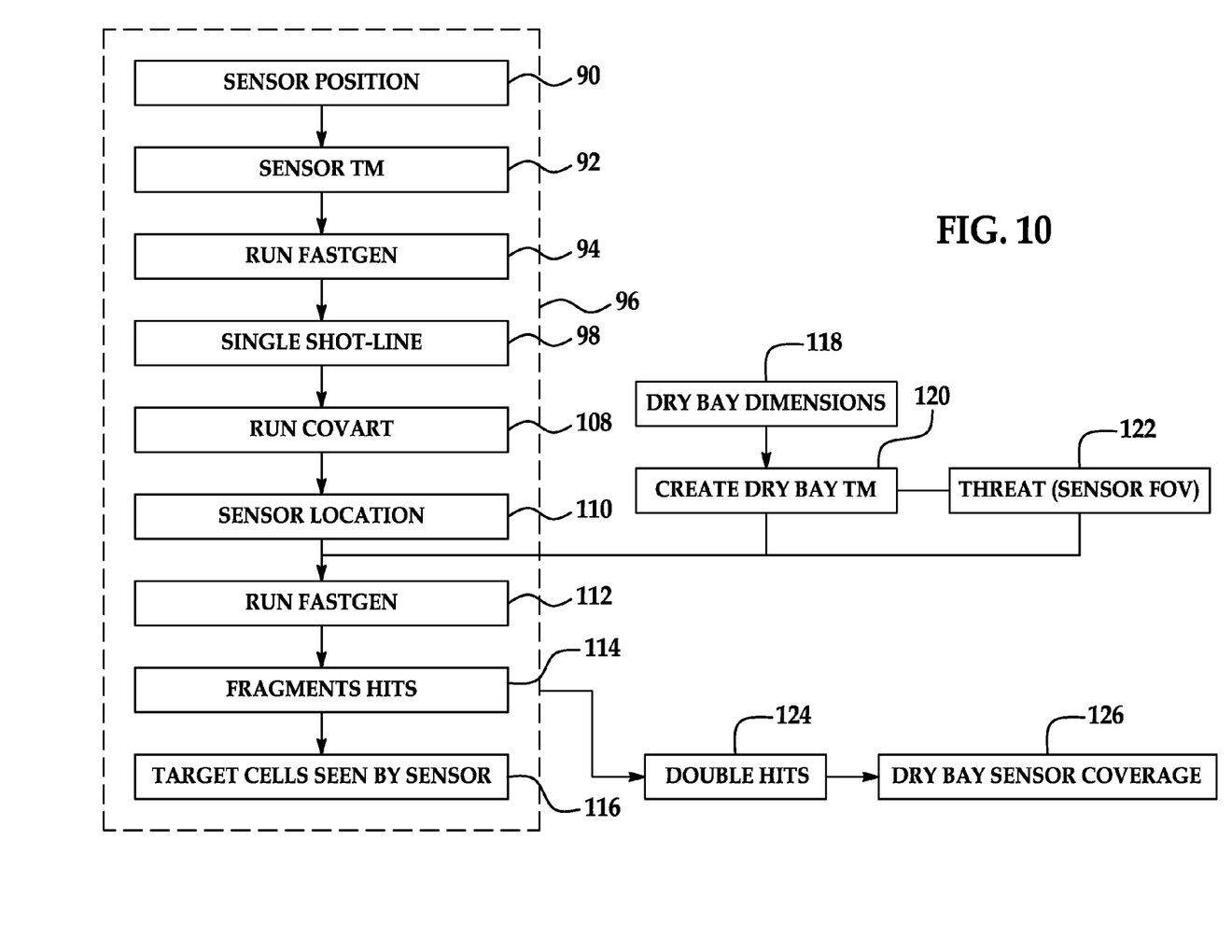
FIG. 10 is an illustration of a flow diagram of a method of determining optical sensor coverage using ballistic vulnerability and damage prediction software tools.

The description below made with reference to FIG. 10 illustrates the use of COVART and FASTGEN to carry out a method of determining the coverage of optical sensors in a 3-D area such as the previously discussed dry bay 32 (FIG. 1). The method described in connection with FIG. 10 may be also used to adjust the coverage provided by multiple sensors in a cluttered 3-D area such as the dry bay 32.

Beginning at step 90, the position of one or more sensors 20 is defined by the user in terms of the sensor's spatial coordinates (x, y, z) and the sensor's orientation in terms of its azimuth $\phi$ and inclination $\theta$. Next, at 92, a sensor target model is developed by a program that creates a geometric target model of a box (sensor 20) centered at the location of the sensor 20.

At 94, the FASTGEN program is run using the sensor position input 90 and the target model created at 92. FASTGEN generates a shot-line 26 (see FIG. 1) through the sensor target model generated in step 92. In the illustrated embodiment, FASTGEN generates the shot-line through the eye 22 of the sensor 20. At step 98, FASTGEN outputs a file (known in FASTGEN as the OBKSB file) which contains a single shot-line 26 passing through the eye 22 of the sensor 20.

At step 108, the COVART program is run using the OBKSB FASTGEN single shot-line file and a user defined threat file of a threat that will burst as soon as it hits an object, in this case the sensor. COVART outputs 110 a file referred to as CCOVBP that puts the threat burst point, i.e. the location and orientation of the sensor 20, into a form that may be read by FASTGEN.

At this point, a user inputs the dimensions of the dry bay 32 at 118, in terms of spatial coordinates in the coordinate system 36 (FIG. 1). At 120, a dry bay target model is generated which may be performed by importing a CAD file into the model that describes the obstructions 34 in the dry bay 32 in terms of their size, shape and locations. Using the dry bay spatial coordinates, a simple program may be created to divide the dry bay into cells 52 and create target blocks to be added to the dry bay target model. The cells 52 completely fill the dry bay 32 in the target model. At 122, the user generates a threat file in which threat fragments (rays 28) emanating from the threat (sensor 20) create the sensor's FOV 24. In one embodiment, approximately 2400 rays may be generated by developing the sensor FOV in step 122.

At 112, the FASTGEN program may be run using as inputs, the sensor FOV file developed at 122, the COVART output file containing the threat burst point (CCOVBP file mentioned above), the dry bay target model generated at 92, and a basic file instructing FASTGEN how to run. At 114, FASTGEN outputs a file referred to as OFRAGA which shows all of the threat fragment shot-lines hitting target model components and/or target blocks, and the order in which they were hit. At step 116, the file output by FASTGEN at step 114 is read, and based on the reading of these output files, a determination may be made as to which of the target blocks (cells 52) have been hit (seen) by the threat (sensor 20).

In some applications, it may be desirable that most or all of the areas within the dry bay 32 are monitored by at least two sensors (e.g., the monitored areas being determined by performing the steps in block 96). In this case, as shown at step 124, a check is made to determine whether all of the target blocks (cells 52) were seen by at least two of the sensors 20. Finally, at 126, the user may create a target model that includes all of the obstructions 34 (components) in the dry bay 32, and the target blocks (cells 52) that are seen by two or more sensors 20.

Figure 11:
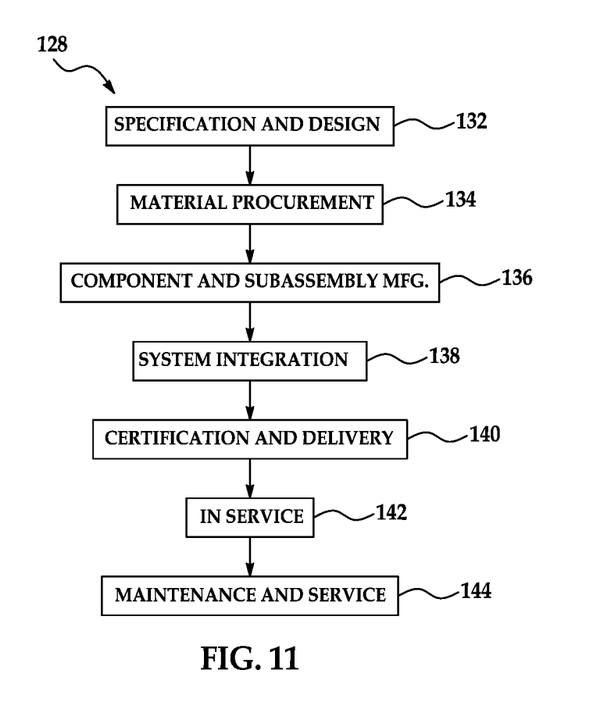
FIG. 11 is an illustration of a flow diagram of aircraft production and service methodology.
Figure 12:
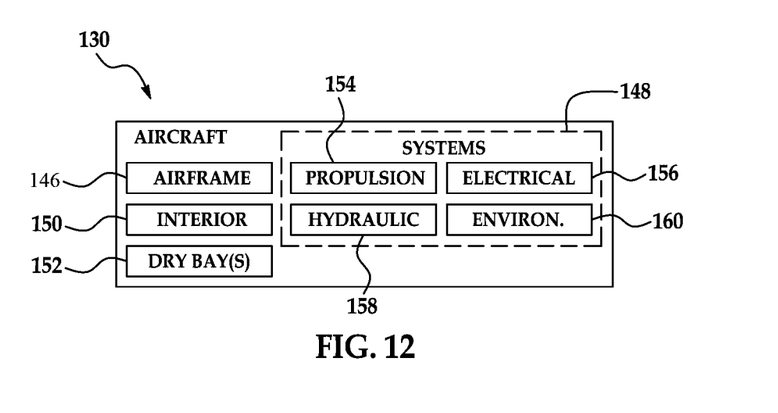
FIG. 12 is an illustration of a block diagram of an aircraft.

Embodiments of the disclosure may find use in a variety of potential applications, particularly in the transportation industry, including for example, aerospace, marine and automotive applications. Thus, referring now to FIGS. 11 and 12, embodiments of the disclosure may be used in the context of an aircraft manufacturing and service method 128 as shown in FIG. 11 and an aircraft 130 as shown in FIG. 12. During pre-production, exemplary method 128 may include specification and design 132 of the aircraft 130 and material procurement 134 in which the disclosed method 128 may be used to determine the optimum number of optical sensors 20 used in one or more dry bays 152 (FIG. 12) forming part of the aircraft 130. During production, component and subassembly manufacturing 136 and system integration 138 of the aircraft 130 takes place. The disclosed method may be used to determine the optimum placement of optical sensors 20 in the dry bay 152, or other parts of the aircraft 130. The dry bay 152 including the sensors 20 may then assembled and integrated with other subassemblies. Thereafter, the aircraft 130 may go through certification and delivery 140 in order to be placed in service 142. While in service by a customer, the aircraft 130 is scheduled for routine maintenance and service 144 (which may also include modification, reconfiguration, refurbishment, and so on). The disclosed method 128 may be used to determine the placement of replacement optical sensors 20 in a dry bay during the maintenance and service 144.

Each of the processes of method 128 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 12, the aircraft 130 produced by exemplary method 128 may include an airframe 146 with a plurality of systems 148, an interior 150 and one or more dry bays 152. Examples of high-level systems 148 include one or more of a propulsion system 154, an electrical system 156, a hydraulic system 158, and an environmental system 160. Any number of other systems may be included. Although an aerospace example is shown, the principles of the disclosure may be applied to other industries, such as the marine and automotive industries.

Systems and methods embodied herein may be employed during any one or more of the stages of the production and service method 128. For example, beaded components or subassemblies corresponding to production process 136 may be fabricated or manufactured in a manner similar to components or subassemblies produced while the aircraft 130 is in service. Also, one or more method embodiments, or a combination thereof may be utilized during the production stages 136 and 138, for example, by substantially expediting assembly of or reducing the cost of an aircraft 130. Similarly, one or more method embodiments, or a combination thereof may be utilized while the aircraft 130 is in service, for example and without limitation, to maintenance and service 144.

Although the embodiments of this disclosure have been described with respect to certain exemplary embodiments, it is to be understood that the specific embodiments are for purposes of illustration and not limitation, as other variations will occur to those of skill in the art.

What is claimed:

1. A method of determining coverages of sensors in a three dimensional (3-D) area representing a dry bay of an aircraft, comprising:
   determining a field of view of a first one of the sensors in the 3-D area representing the dry bay of the aircraft;
   projecting rays from the first sensor into the 3-D area within the field of view of the first sensor;
   dividing the 3-D area into cells;
   determining intersections between the rays and the cells; and
   based on the intersections, generating a visual display of the 3-D area by controlling visibility of the cells to indicate the coverage of the sensors including the first sensor, each of the cells to be visible or not visible based on whether the cell is intersected by rays from at least two of the sensors.

2. The method of claim 1, further comprising:
   introducing at least one obstruction into the 3-D area; and
   determining the intersections between the rays and the obstruction, and
   wherein generating the visual display includes displaying the obstruction.

3. The method of claim 2, further comprising:
   generating a model of the 3-D area including the obstruction, and
   wherein generating the visual display includes visually displaying the 3-D area model.

4. The method of claim 1, wherein determining the field of view of the sensor includes:
   determining a location of the first sensor in the 3-D area;
   determining an orientation of the first sensor; and
   projecting a shot-line from the first sensor into the 3-D area.

5. The method of claim 4, wherein:
determining the location of the first sensor includes determining spatial coordinates of the first sensor within the 3-D area, and
determining the orientation of the first sensor includes determining an azimuth and an inclination of the first sensor.

6. The method of claim 1, wherein projecting the rays includes projecting diverging rays from the first sensor into the 3-D area within the field of view.

7. The method of claim 1, further comprising:
determining a sequential order in which each of the projected rays intersects the cells.

8. A method as defined in claim 1, further comprising assembling the dry bay of the aircraft by including the first sensor having the field of view.

9. A method of determining coverages of at least two optical sensors monitoring a three dimensional (3-D) area representing a part of an aircraft, comprising:
determining a position of a first one of the optical sensors within the 3-D area representing the part of the aircraft;
generating a 3-D model of the 3-D area, the 3-D model representing the part of the aircraft;
introducing at least one obstruction into the 3-D model;
dividing the 3-D model into cells;
projecting rays from the first optical sensors into the 3-D area within the 3-D model;
identifying intersections between the projected rays and the cells; and
generating a visual display of the 3-D model showing areas covered by the optical sensors including the first optical sensor based on the identified intersections, the cells covered by at least two of the optical sensors being either visible or not visible and the cells not covered by at least two of the optical sensors being the other of visible or not visible.

10. The method of claim 9, wherein determining the position of the first one of the optical sensors includes determining spatial coordinates, an azimuth and an inclination of the first one of the optical sensors.

11. The method of claim 9, wherein generating a 3-D model of the 3-D area includes:
positioning the first optical sensor within a model of the 3-D area, and projecting a shot-line from the first optical sensor into the 3-D area of the model.

12. The method of claim 9, wherein projecting the rays includes projecting diverging rays from the first optical sensor into the 3-D area within a field of view of the first sensor.

13. The method of claim 9, wherein generating a visual display of the 3-D model includes displaying the areas not covered by the first optical sensor due to the presence in the 3-D area of the obstruction.

14. The method of claim 9, further comprising:
determining a sequential order in which each of the projected rays intersects the cells.

15. A method of optimizing coverages of optical sensors monitoring a three dimensional (3-D) area representing a dry bay of an aircraft and containing obstructions, comprising:
selecting a location and orientation for each of the optical sensors within the 3-D area representing the dry bay of the aircraft;
generating a 3-D model of the 3-D area including the optical sensors, the 3-D model representing the dry bay of the aircraft;
introducing obstructions into the 3-D model;
dividing the 3-D model into cells;
projecting rays from each of the optical sensors into the 3-D area of the model;
identifying the cells and obstructions intersected by the projected rays;
generating a visual display of the 3-D model showing delineations of the cells to indicate the locations that are covered by at least two of the optical sensors and gaps in the 3-D area that are not covered by at least two of the optical sensors; and
changing at least one of a number of sensors, a location, or an orientation of at least one of the sensors based on the visual display.

16. The method of claim 15, wherein generating the 3-D model is performed by a computer program, and introducing the obstructions into the 3-D model includes importing an electronic file containing data representing the obstructions into the computer program.

17. The method of claim 15, wherein projecting the rays includes projecting diverging rays from each of the optical sensors into the 3-D area within a field of view of the first sensor.

18. The method of claim 15, further comprising determining a sequential order in which each of the projected rays intersects the cells.

19. A method of determining the coverage of optical sensors monitoring a three dimensional (3-D) area representing a dry bay of an aircraft and containing obstructions, comprising:
determining a location and an orientation of each of the sensors within the 3-D area representing the dry bay of the aircraft;
generating a respective target model of a box centered at the location of each of the sensors;
generating a shot-line ray from each of the sensors to the corresponding target model box;
generating a 3-D model of the 3-D area including the sensors, the model representing the dry bay of the aircraft;
introducing obstructions into the 3-D model;
dividing the 3-D model into cells;
projecting diverging ray lines from each of the sensors into the 3-D area of the model by modeling each of the sensors as a burst threat using the shot-line ray and the 3-D model;
identifying the cells and the obstructions intersected by the projected rays using the diverging ray lines and the 3-D model;
generating a visual display of the 3-D model showing the locations of the sensors, first areas covered by at least two of the sensors being one of visible or not visible, and second areas not covered by at least two of the sensors being the other of visible or not visible;
changing the location or orientation of at least one of the sensors based on the visual display of the first and second areas; and
assembling the dry bay of the aircraft by including physical sensors in locations corresponding to the locations of the respective sensors in the 3-D model.

20. A method as defined in claim 19, wherein generating a shot-line ray from each of the sensors comprises using a first tool, and wherein modeling of each of the sensors as a burst threat comprises using a second tool having the shot-line ray as an input.

* * * * *